US009823099B2

(12) United States Patent
Horvath et al.

(10) Patent No.: US 9,823,099 B2
(45) Date of Patent: Nov. 21, 2017

(54) INSTRUMENT PANEL METER

(71) Applicants: DENSO International America, Inc., Southfield, MI (US); DENSO CORPORATION, Kariya-shi, Aichi-ken (JP)

(72) Inventors: Cary Horvath, Dearborn, MI (US); Michael Lozano, Detroit, MI (US); Marc Arceo, Livonia, MI (US); Gareth Webb, Farmington, MI (US)

(73) Assignees: DENSO International America, Inc., Southfield, MI (US); DENSO CORPORATION, Kariya, Aichi-pref. (JP)

( * ) Notice: Subject to any disclaimer, the term of this patent is extended or adjusted under 35 U.S.C. 154(b) by 177 days.

(21) Appl. No.: 14/966,582

(22) Filed: Dec. 11, 2015

(65) Prior Publication Data
US 2017/0167901 A1   Jun. 15, 2017

(51) Int. Cl.
*G01D 13/22* (2006.01)
*G01D 13/26* (2006.01)
*B60K 37/02* (2006.01)

(52) U.S. Cl.
CPC ............ *G01D 13/265* (2013.01); *B60K 37/02* (2013.01); *G01D 13/22* (2013.01); *B60K 2350/408* (2013.01)

(58) Field of Classification Search
CPC ........ G01D 11/28; G01D 13/22; G01D 13/26; G01D 13/265; G12B 11/04

USPC ... 116/62.1, 62.2, 62.3, 62.4, 286, 287, 288, 116/DIG. 5, DIG. 6, DIG. 36; 362/23.21
See application file for complete search history.

(56) References Cited

U.S. PATENT DOCUMENTS

| | | | | |
|---|---|---|---|---|
| 3,592,158 A | * | 7/1971 | Gear | G01D 13/06 116/278 |
| 7,023,764 B2 | * | 4/2006 | Wolf et al. | G04B 45/00 368/223 |
| 7,431,484 B2 | | 10/2008 | Fong | |
| 2017/0023387 A1 | * | 1/2017 | Gascon Rivera | G01D 13/28 |

FOREIGN PATENT DOCUMENTS

| | | | | |
|---|---|---|---|---|
| DE | 102013019192 A1 | * | 5/2015 | B60K 35/00 |
| GB | 1218775 A | * | 1/1971 | G01D 13/06 |

* cited by examiner

*Primary Examiner* — R. A. Smith
(74) *Attorney, Agent, or Firm* — Harness, Dickey & Pierce, P.L.C.

(57) ABSTRACT

An instrument panel meter including a flexible face and a pointer. The flexible face includes indicators configured to convey information to a user regarding operation of the vehicle. The pointer is beneath the flexible face, and is movable between an inactive position and an active position. In the inactive position, the pointer does not stretch the flexible face. In the active position, the pointer does stretch the flexible face at or proximate to one of the indicators so as to convey information to the user regarding operation of the vehicle.

20 Claims, 3 Drawing Sheets

INSTRUMENT PANEL METER

FIELD

The present disclosure relates to an instrument panel meter including a flexible face.

BACKGROUND

This section provides background information related to the present disclosure, which is not necessarily prior art.

Vehicles typically include an instrument panel with one or more meters configured to convey information to the driver regarding operation of the vehicle. For example, meters for conveying speed of the vehicle and engine RPMs are often included. While existing instrument panel meters are suitable for their intended use, they are subject to improvement. The present teachings provide for instrument panel meters having various improvements over the art.

SUMMARY

This section provides a general summary of the disclosure, and is not a comprehensive disclosure of its full scope or all of its features.

The present teachings provide for an instrument panel meter including a pointer and a flexible face. The flexible face includes indicators configured to convey information to a user regarding operation of the vehicle. The pointer is beneath the flexible face, and is movable between an inactive position and an active position. In the inactive position, the pointer does not stretch the flexible face. In the active position, the pointer does stretch the flexible face at or proximate to one of the indicators so as to convey information to the user regarding operation of the vehicle.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
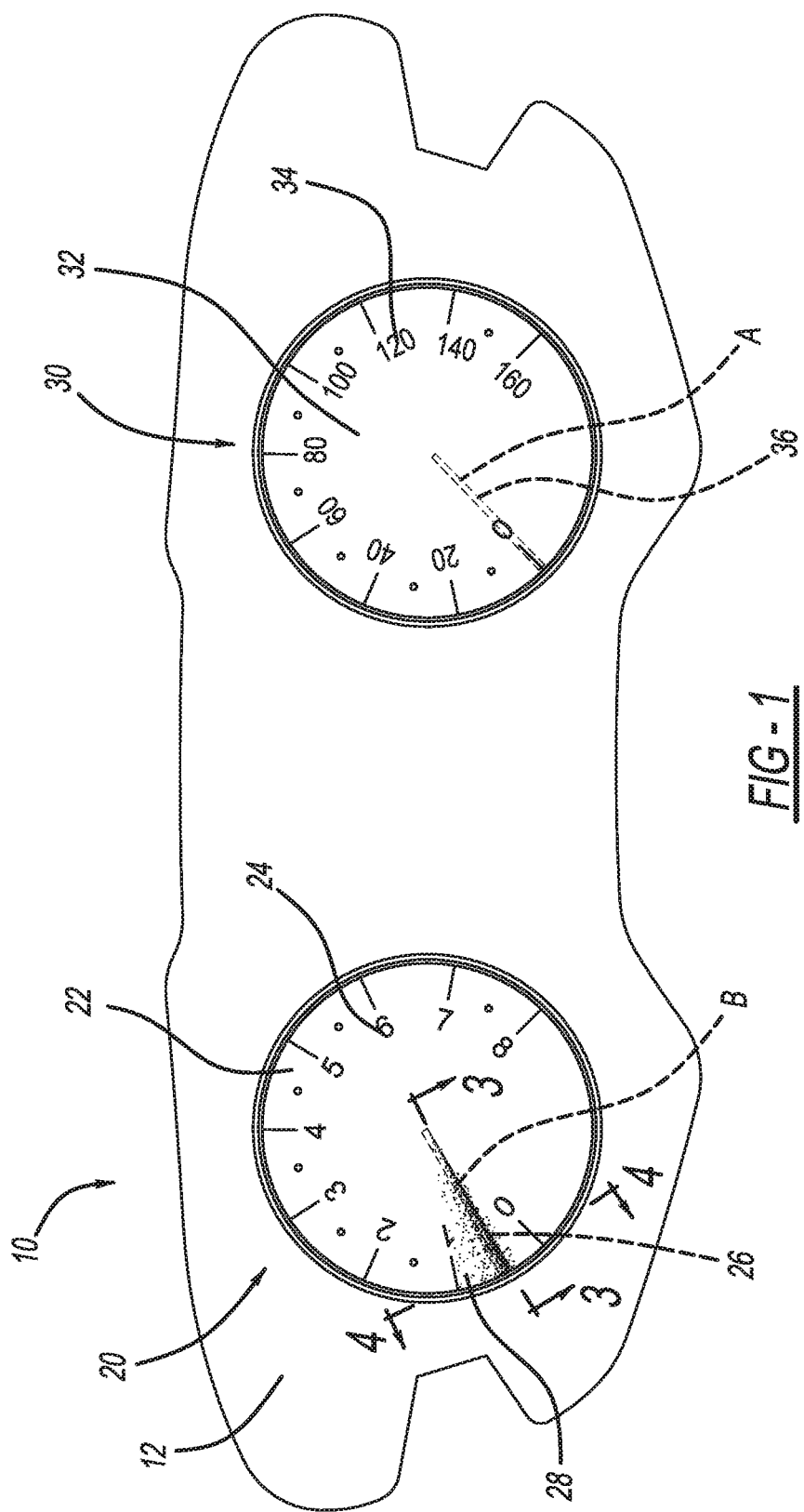
FIG. 1 illustrates an instrument panel meter cluster including meters according to the present teachings.

FIG. 1 illustrates an instrument panel meter cluster at reference numeral 10. The instrument panel meter cluster 10 is illustrated and described herein as a vehicle instrument panel meter cluster. However, the present teachings apply to any suitable meter of any suitable machine, such as any vehicle (including any suitable passenger vehicle, mass transit vehicle, recreational vehicle, military vehicle, motorcycle, aircraft, watercraft etc.) and any suitable building system, such as an HVAC system, power system, etc.

The instrument panel meter cluster 10 includes a window or plate 12 with a first meter 20 according to the present teachings mounted thereto. The first meter 20 includes a flexible face 22 with indicators 24 thereon. Below the flexible face 22 is a pointer 26, which is illustrated in phantom in FIG. 1. In the example of FIG. 1, the pointer 26 is in a raised or active position such that the pointer 26 stretches and/or raises the flexible face 22 outward and away from the window or plate 12.

Figure 4:
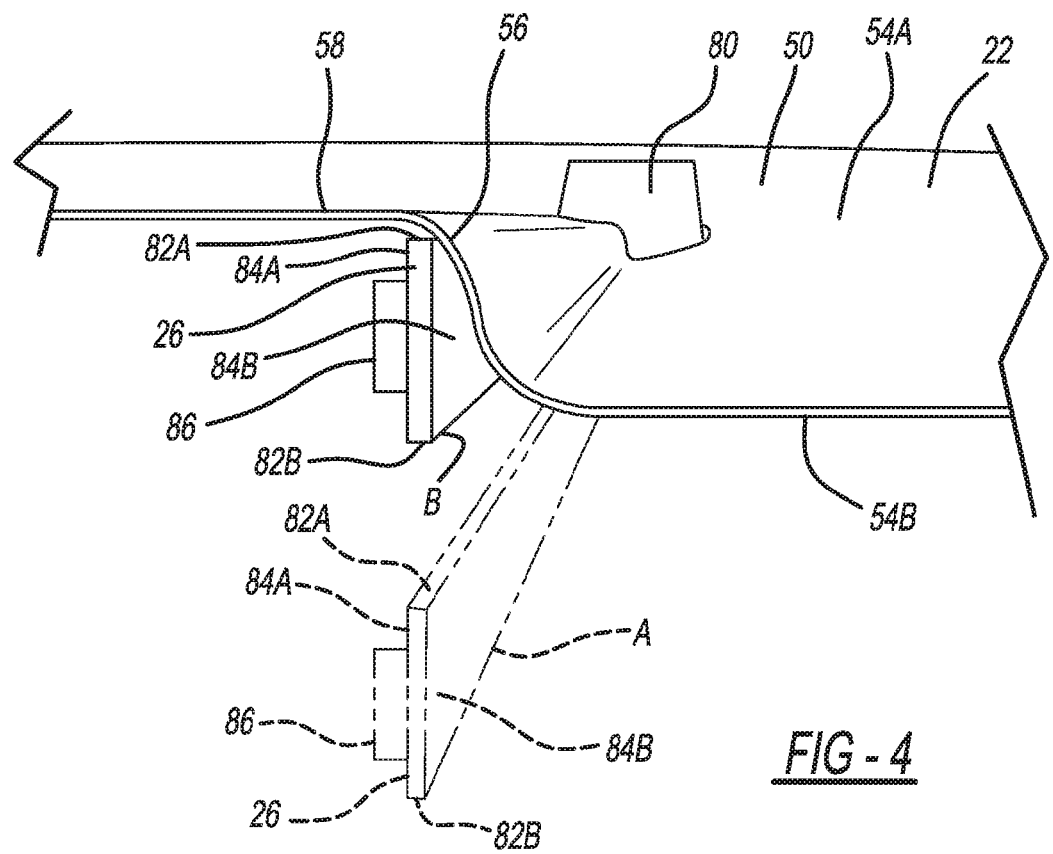
FIG. 4 is a cross-sectional view taken along line 4-4 of FIG. 1.

The pointer 26 is movable in a clockwise and counter-clockwise position to any one of the indicators 24, or positions therebetween. The indicators 24 can be configured to convey any suitable information to a user of the vehicle, such as engine RPMs as illustrated, vehicle speed, fuel level, engine temperature, etc. When the pointer 26 is in the raised/active position B of FIG. 1, the pointer 26 will raise, stretch, or otherwise physically deform the flexible face 22 at any one of the indicators 24, or positions therebetween, corresponding to the particular information to be conveyed to the user. For example, if the engine is operating at 4,000 RPMs, the pointer 26 will rotate clockwise to beneath the number "4" of the indicators 24. The pointer 26 will stretch, raise, or otherwise deform the flexible face 22 at the number "4," as well as at a portion of the flexible face 22 proximate thereto, as also illustrated in FIG. 4. The pointer 26 may include a light source 86 (FIG. 4), as described herein, to provide illuminated area 28. The light source 86 can be configured to direct the illuminated area 28 only ahead of the pointer 26 relative to a forward direction of travel of the pointer 26.

FIG. 1 also illustrates a second meter 30, which is substantially similar to the first meter 20. The second meter 30 includes a flexible face 32, which is the same as the flexible face 22. Indicators 34 are the same as indicators 24, except configured as a speedometer. Pointer 36 of the second meter 30 is the same as the pointer 26, except that the pointer 36 is illustrated as inactive and lowered at position A. Because the pointer 36 is inactive and lowered, it does not stretch, raise, or otherwise deform the flexible face 32, and therefore, the flexible face 32 is generally planar or flat. This provides the second meter 30 with a sleek and smooth appearance when inactive. When the pointer 26 is inactive, so as to not stretch, raise, or otherwise deform the flexible face 32, the flexible face 22 of the first meter 20 will be generally planar or flat, as the second meter 30 is in FIG. 1. The second meter 30 is without an illuminated area because the pointer 36 is lowered and inactive. When the pointer 36 is raised and active as the pointer 26 is in FIG. 1, the second meter 30 can also be provided with an illuminated area that is the same as the illuminated area 28 of the first meter 20. Although FIG. 1 illustrates the pointer 26 in the raised/active position, and the pointer 36 in the lowered/inactive position, this configuration is provided for illustrative purposes only because during typical operation it is unlikely that the first meter 20 will be active when the second meter 30 is inactive. Instead, it is more likely that the first and second meters 20 and 30 will be simultaneously active or inactive.

Figure 2:
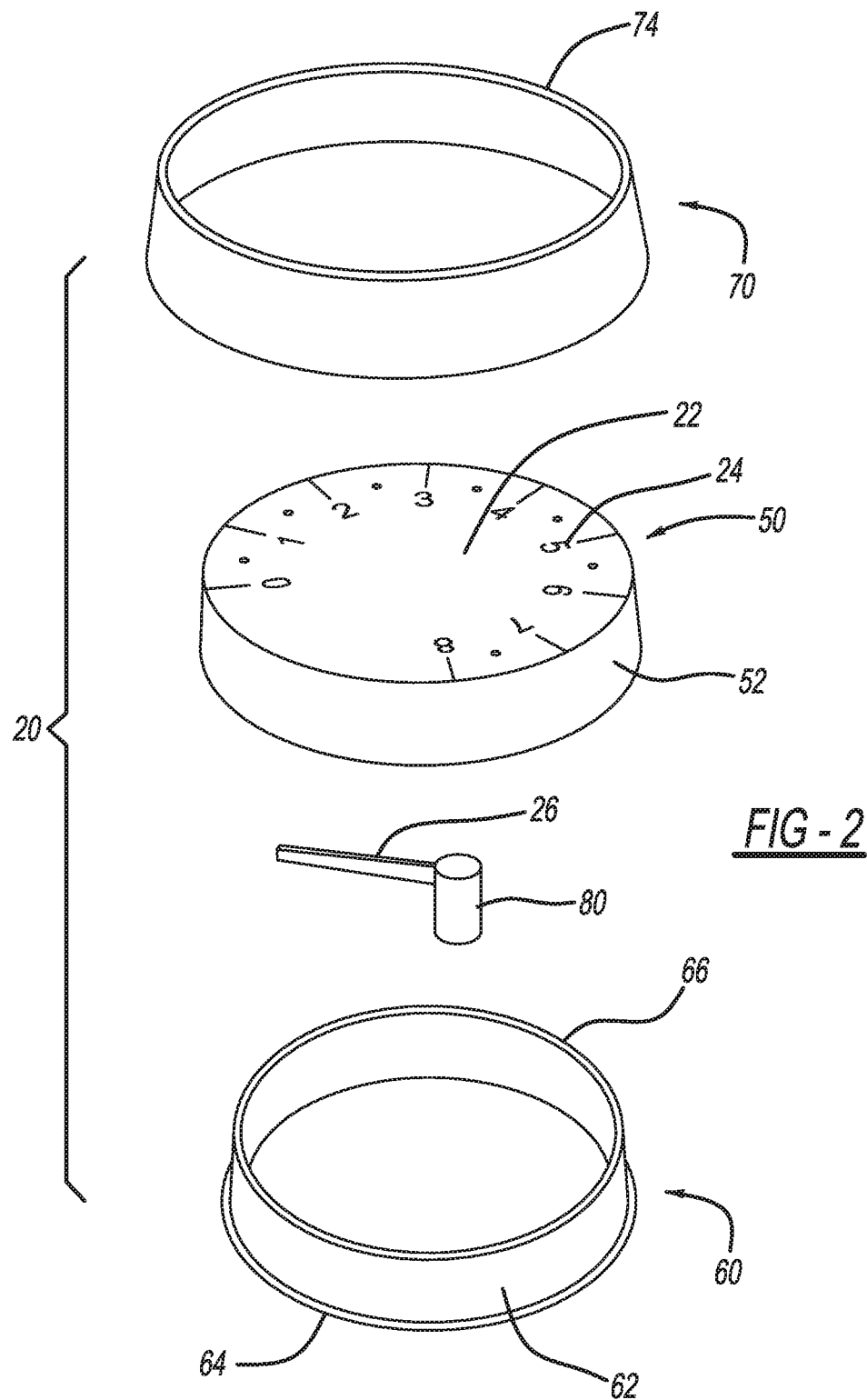
FIG. 2 is an exploded view of one of the meters of FIG. 1.

FIG. 2 is an exploded view of the first meter 20. Because the first meter 20 is the same as the second meter 30, but for the configuration of the indicators 24/34 and position of the pointers 26/36, the description and illustration of the first meter 20 in FIGS. 2-4 also applies to the second meter 30. The flexible face 22 is part of a flexible member 50, which further includes a skirt portion 52 extending from an outer diameter of the flexible face 22. The skirt portion 52 extends downward from the flexible face 22, such as at a right angle, or at an angle that is less than 90°.

The flexible member 50 is seated over a base 60, which may be configured as a cylinder or annular ring as illustrated. The base 60 includes an outer sidewall 62, which extends to a lower flange 64. The base 60 is secured to the window or plate 12 of the instrument panel meter cluster 10 in any suitable manner, such as with any suitable adhesive. The flexible member 50 is seated over the base 60, such that the skirt portion 52 extends down and over the outer sidewall 62, and the flexible face 22 extends across the base 60.

The first meter 20 further includes a frame 70. The frame 70 can be a cylinder or annular ring as illustrated, and is sized to be seated over the base 60 and the flexible member 50. Specifically and with additional reference to FIG. 3, the frame 70 is seated over the skirt portion 52 in order to secure and sandwich the skirt portion 52 between the frame 70 and the base 60. The frame 70 includes a recess 72 at a bottom portion thereof, which is configured to receive the lower flange 64 of the base 60 therein. An upper flange 74 of the frame 70 is seated over an upper portion 66 of the base 60. The frame 70 is secured to the window or plate in any suitable manner, such as with any suitable adhesive. As a result, the flexible member 50 is secured in place with the skirt portion 52 being anchored between the frame 70 and the base 60, and the flexible face 22 extending across and over the base 60.

Figure 3:
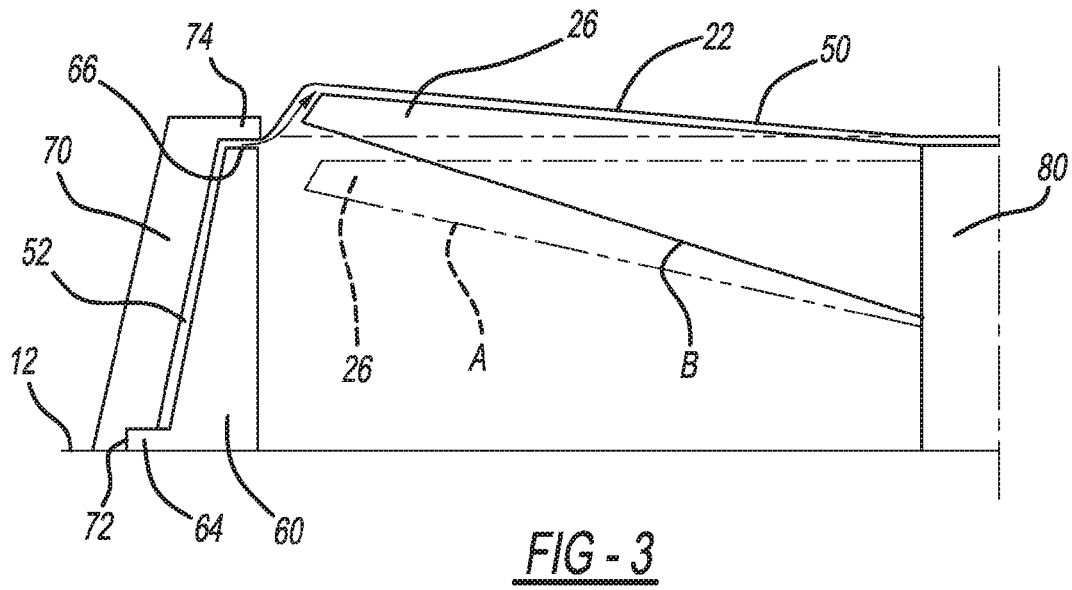
FIG. 3 is a cross-sectional view taken along line 3-3 of FIG. 1.

The first meter 20 further includes a pointer hub 80, which can be arranged at an axial center at each of the flexible member 50, the base 60, and the frame 70, or at any other suitable location beneath the flexible member 50. The pointer 26 is secured to the pointer hub 80 in any suitable manner to permit the pointer 26 to move between a lowered/inactive position A and a raised/active position B, as illustrated in FIGS. 3 and 4 for example. The pointer 26 can be moved between the positions A and B in any suitable manner, with any suitable device or system.

In the lowered/inactive position A, the pointer 26 does not stretch, raise, or otherwise deform the flexible face 22, and can be spaced apart from the flexible face 22. Specifically, the flexible face 22 can include an outer surface 54A and an inner surface 54B, as illustrated in FIG. 4 for example. In the lowered/inactive position A, the pointer 26 can be spaced apart from the inner surface 54B. In the raised/active position B, the pointer 26 is raised so as to contact the inner surface 54B and stretch, raise, or otherwise deform the flexible face 22. Specifically and as illustrated in FIG. 4, in the raised/active position B, the pointer 26 stretches the flexible face 22 at a stretched portion 56 and raises the flexible face 22 resulting in a raised portion 58 of the flexible face 22. The pointer 26 can be rotated by the pointer hub 80 in either one of the lowered/inactive position A or the raised/active position B. As the pointer 26 rotates clockwise or counterclockwise in the raised/active position B, the stretched and raised portions 56 and 58 will move, such as slidably move, about the flexible face 22 in a clockwise or counterclockwise direction in accordance with movement of the pointer 26 in the clockwise or counterclockwise direction.

With particular reference to FIG. 4, the pointer 26 includes an upper surface 82A and a lower surface 82B, which is opposite to the upper surface 82A. When the pointer 26 is in the raised/active position B, it is generally the upper surface 82A that contacts the inner surface 54B of the flexible face 22 in order to stretch, raise, or otherwise deform the flexible face 22. The pointer 26 further includes a front surface 84A and a rear surface 84B, which is opposite to the front surface 84A. The front surface 84A faces in the initial or primary direction of travel of the pointer 26, such as in the "upstream" or in the clockwise direction of travel.

The pointer 26 further includes a light source 86, which can be provided at any suitable portion of the pointer 26, such as at the front surface 84A. The light source 86 can be any suitable light source configured to provide the illuminated area 28. For example, the light source 86 can be a light guide configured to direct light generated elsewhere to provide the illuminated area 28, or the light source 86 itself can be configured to generate light to the illuminated area 28. With the light source 86 at the front surface 84A, the light source 86 is configured to direct light only ahead of the pointer 26 relative to a forward direction of travel of the pointer about the flexible face 22. The light source 86 can be configured and arranged to direct light to any other suitable location as well, however.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used is for the purpose of describing particular example embodiments only and is not intended to be limiting. The singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An instrument panel meter comprising:
    a flexible face including indicators configured to convey information to a user regarding operation of a vehicle; and
    a pointer beneath the flexible face, the pointer movable between an inactive position in which the pointer does not stretch the flexible face, and an active position in which the pointer does stretch the flexible face at or proximate to one of the indicators so as to convey information to the user regarding operation of the vehicle.

2. The instrument panel meter of claim 1, wherein the flexible face includes a flexible fabric.

3. The instrument panel meter of claim 1, further comprising a flexible member including the flexible face and a skirt extending from an outer diameter of the flexible face.

4. The instrument panel meter of claim 3, wherein the flexible member is secured between a base and a frame, the base mounted to a window of an instrument panel meter cluster.

5. The instrument panel meter of claim 1, wherein the pointer extends from a pointer hub.

6. The instrument panel meter of claim 5, wherein the pointer hub is at a center of the flexible face and is rotatable to position the pointer at different indicators of the flexible face.

7. The instrument panel meter of claim 1, wherein the pointer includes a light source configured to emit light on only a single side of the pointer.

8. The instrument panel meter of claim 7, wherein the light source is a light guide in receipt of light generated remote to the pointer.

9. An instrument panel meter comprising:
    a base;
    a frame seated over the base;
    a flexible member secured between the base and the frame, the flexible member including a flexible face and a skirt extending from an outer diameter of the flexible face; and
    a pointer beneath the flexible face, the pointer movable between an inactive position and an active position in which the pointer raises the flexible face at or proximate to one of the indicators so as to convey information to the user regarding operation of the vehicle.

10. The instrument panel meter of claim 9, wherein the skirt of the flexible member is sandwiched between the base and the frame, and the flexible face extends across the base.

11. The instrument panel meter of claim 9, wherein the pointer is spaced apart from the flexible face when the pointer is in the inactive position.

12. The instrument panel meter of claim 9, wherein the pointer includes a light source configured to direct light only ahead of the pointer relative to a forward direction of travel of the pointer.

13. The instrument panel meter of claim 12, wherein the light source is a light guide.

14. The instrument panel meter of claim 9, wherein the flexible member is nylon.

15. The instrument panel meter of claim 9, wherein the base is secured to a plate of an instrument panel meter cluster.

16. The instrument panel meter of claim 9, wherein in the inactive position the pointer does not stretch the flexible face, and in the active position the pointer does stretch the flexible face.

17. The instrument panel meter of claim 9, wherein the pointer is configured to pivot between the inactive position and the active position.

18. The instrument panel meter of claim 9, wherein the pointer extends from a hub at a center of each of the base, the frame, and the flexible face.

19. An instrument panel meter comprising:
    a base cylinder mounted to a plate of an instrument panel meter cluster;
    a flexible member including a flexible face and a skirt extending from an outer diameter of the flexible face, the flexible face extends over the base cylinder and the skirt extends along an outer sidewall of the base cylinder;
    indicators on the flexible face for conveying information to a user regarding operation of a vehicle;
    a frame seated over the base cylinder to secure the skirt between the frame and the base cylinder;
    a pointer hub beneath the flexible face and rotatable in a clockwise and counterclockwise direction, the pointer hub is at an axial center of each of the base cylinder, the flexible face, and the frame;
    a pointer extending from the pointer hub and rotatable in both the clockwise and counterclockwise direction by the pointer hub, the pointer movable between a lowered inactive position in which the pointer does not stretch or raise the flexible face, and a raised active position in which the pointer does stretch and raise the flexible face at or proximate to one of the indicators so as to convey information to the user regarding operation of the vehicle; and
    a light guide at a front surface of the pointer and configured to direct light only ahead of the pointer relative to a forward direction of travel of the pointer.

20. The instrument panel meter of claim 19, wherein the flexible member is nylon.

* * * * *